United States Patent
Xu et al.

(10) Patent No.: US 10,699,104 B2
(45) Date of Patent: Jun. 30, 2020

(54) IMAGE OBTAINING BASED ON EMOTIONAL STATUS

(71) Applicant: International Business Machines Corporation, Armonk, NY (US)

(72) Inventors: Cheng Xu, Beijing (CN); Su Liu, Austin, TX (US); Bing Fang, Jiangdong (CN); Li Ya Feng, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/970,219

(22) Filed: May 3, 2018

(65) Prior Publication Data

US 2019/0340425 A1 Nov. 7, 2019

(51) Int. Cl.
*G06K 9/00* (2006.01)
*G10L 25/63* (2013.01)

(52) U.S. Cl.
CPC ..... *G06K 9/00335* (2013.01); *G06K 9/00302* (2013.01); *G10L 25/63* (2013.01)

(58) Field of Classification Search
CPC . G06K 9/00335; G06K 9/00302; G10L 25/63
See application file for complete search history.

(56) References Cited

U.S. PATENT DOCUMENTS

| | | | |
|---|---|---|---|
| 9,576,175 B2 * | 2/2017 | Chembula | G06K 9/00 |
| 2010/0177116 A1 * | 7/2010 | Dahllof | G06F 3/011 |
| | | | 345/619 |
| 2011/0296324 A1 * | 12/2011 | Goossens | G06Q 10/10 |
| | | | 715/763 |
| 2012/0059787 A1 * | 3/2012 | Brown | G06F 17/241 |
| | | | 706/52 |
| 2013/0159919 A1 * | 6/2013 | Leydon | G06F 3/0236 |
| | | | 715/780 |
| 2014/0143682 A1 * | 5/2014 | Druck | G06Q 10/107 |
| | | | 715/752 |
| 2014/0214409 A1 | 7/2014 | Leydon | |
| 2015/0222586 A1 | 8/2015 | Ebersman et al. | |
| 2016/0050169 A1 * | 2/2016 | Ben Atar | H04M 1/72544 |
| | | | 709/206 |
| 2016/0210279 A1 | 7/2016 | Kim et al. | |
| 2016/0210963 A1 | 7/2016 | Kim et al. | |
| 2016/0253552 A1 | 9/2016 | Rihn et al. | |
| 2017/0185581 A1 * | 6/2017 | Bojja | G06F 17/24 |
| 2018/0025219 A1 * | 1/2018 | Baldwin | H04L 51/20 |
| | | | 382/118 |

(Continued)

OTHER PUBLICATIONS

Android Apps, "How to create and share personalized stickers and GIFs with your own face on them," Apr. 6, 2017 [accessed online] <http://www.theandroidsoul.com/how-to-create-and-share-personalized-stickers-and-gifs-with-your-own-face-on-them/>.

(Continued)

*Primary Examiner* — Brenda C Bernardi
(74) *Attorney, Agent, or Firm* — Patterson + Sheridan, LLP

(57) ABSTRACT

The present disclosure provides a method, computer system and computer program product for obtaining an image. According to the method, an emotional status of a user is determined, at least one character can be determined based on a preference of the user, and at least one image comprising the at least one character can be obtained based on the emotional status of the user.

17 Claims, 6 Drawing Sheets

(56) References Cited

U.S. PATENT DOCUMENTS

| | | | | |
|---|---|---|---|---|
| 2018/0026925 A1* | 1/2018 | Kennedy | ................ | H04L 51/20 |
| | | | | 715/753 |
| 2018/0027307 A1* | 1/2018 | Ni | ..................... | H04N 21/4788 |
| | | | | 345/419 |
| 2018/0077095 A1* | 3/2018 | Deyle | .................... | H04L 51/10 |
| 2018/0330152 A1* | 11/2018 | Mittelstaedt | ....... | G06K 9/00302 |
| 2019/0012527 A1* | 1/2019 | Wang | ................ | G06K 9/00281 |

OTHER PUBLICATIONS

Core Sector Communique, "Hike Launches More than 5000 Free Stickers in More than 30 Languages to Make Messaging Fun", [accessed onlin] <http://corecommunique.com/hike-launches-more-than-5000-free-stickers-in-more-than-30-languages-to-make-messaging-fun/>.

* cited by examiner

600

IMAGE OBTAINING BASED ON EMOTIONAL STATUS

BACKGROUND

The present invention relates to image obtaining, and more specifically, to methods and systems for obtaining images based on emotional statuses of users.

Nowadays, emojis are widely used for expressing emotions of users. For example, when a user is chatting with another user using a social network application, the user can attach an emoji to a message to express current emotion of the user.

SUMMARY

According to one embodiment of the present invention, there is provided a computer-implemented method for obtaining an image. According to the method, an emotional status of a user can be determined, at least one character can be determined based on a preference of the user, and at least one image comprising the at least one character based on the emotional status of the user can be obtained.

According to another embodiment of the present invention, there is provided a computer system for obtaining an image. The computer system comprises a processor, a computer-readable memory coupled to the processor. The computer-readable memory comprises instructions that when executed by the processor perform actions of: determining an emotional status of a user; determining at least one character based on a preference of the user; and obtaining at least one image comprising the at least one character based on the emotional status of the user.

According to another embodiment of the present invention, there is provided a computer program product for obtaining an image. The computer program product comprises a computer readable storage medium having program instructions embodied therewith, the program instructions executable by a processor to cause the processor perform actions of: determining an emotional status of a user; determining at least one character based on a preference of the user; and obtaining at least one image comprising the at least one character based on the emotional status of the user.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
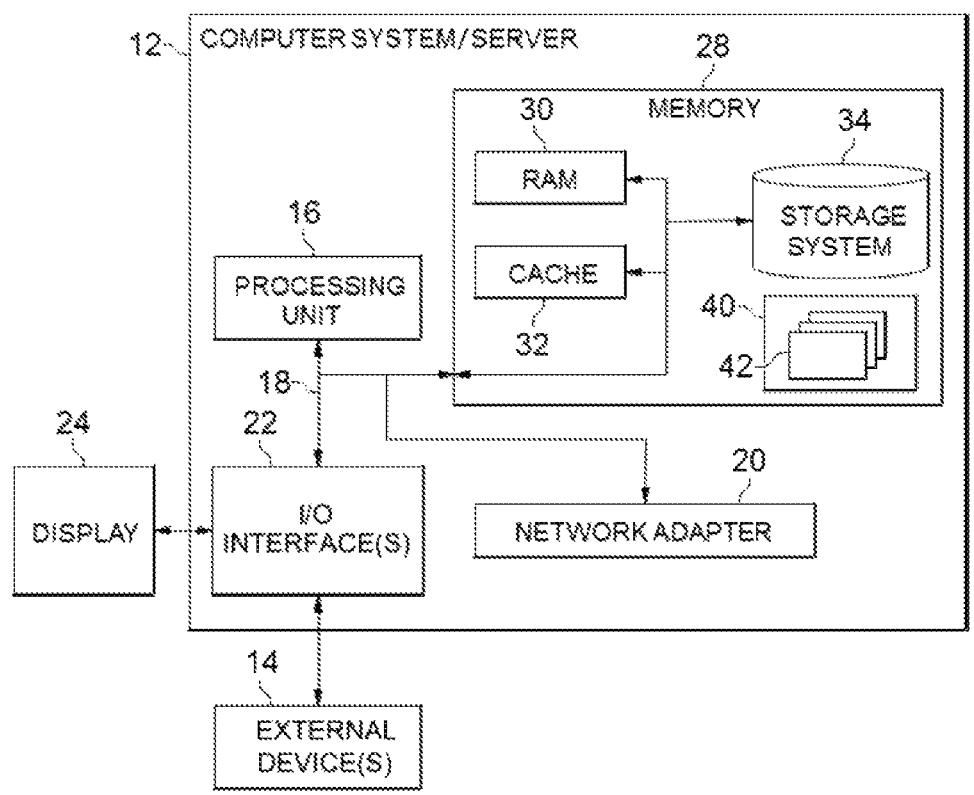
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
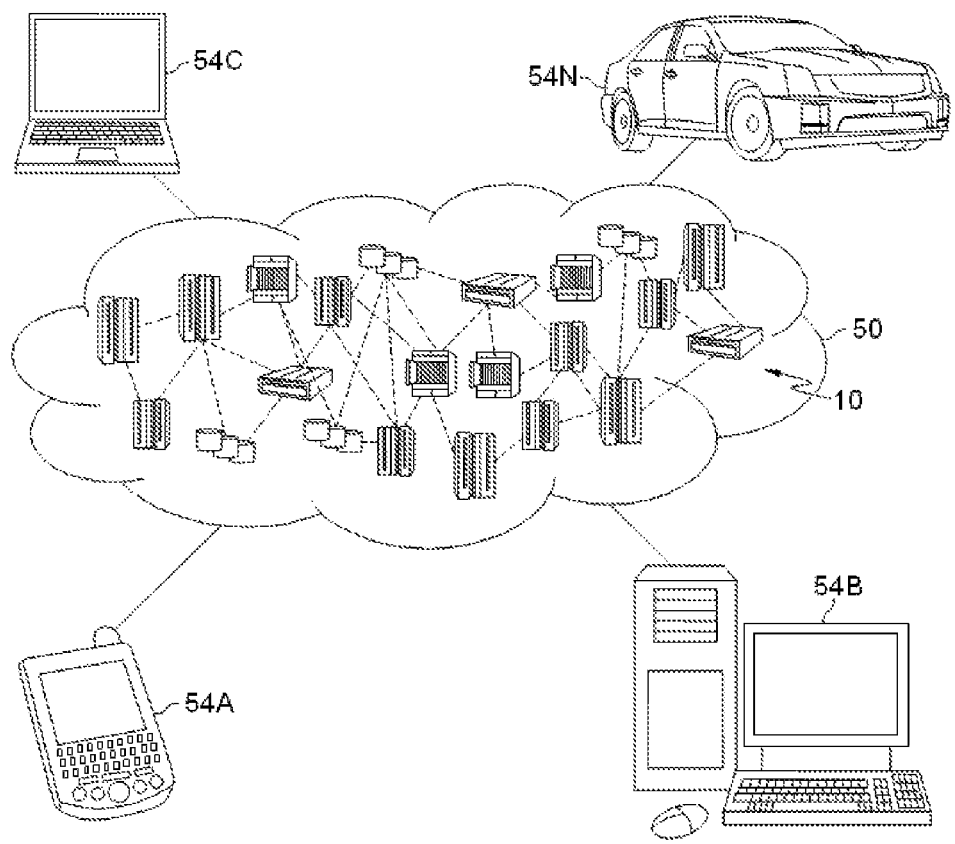
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
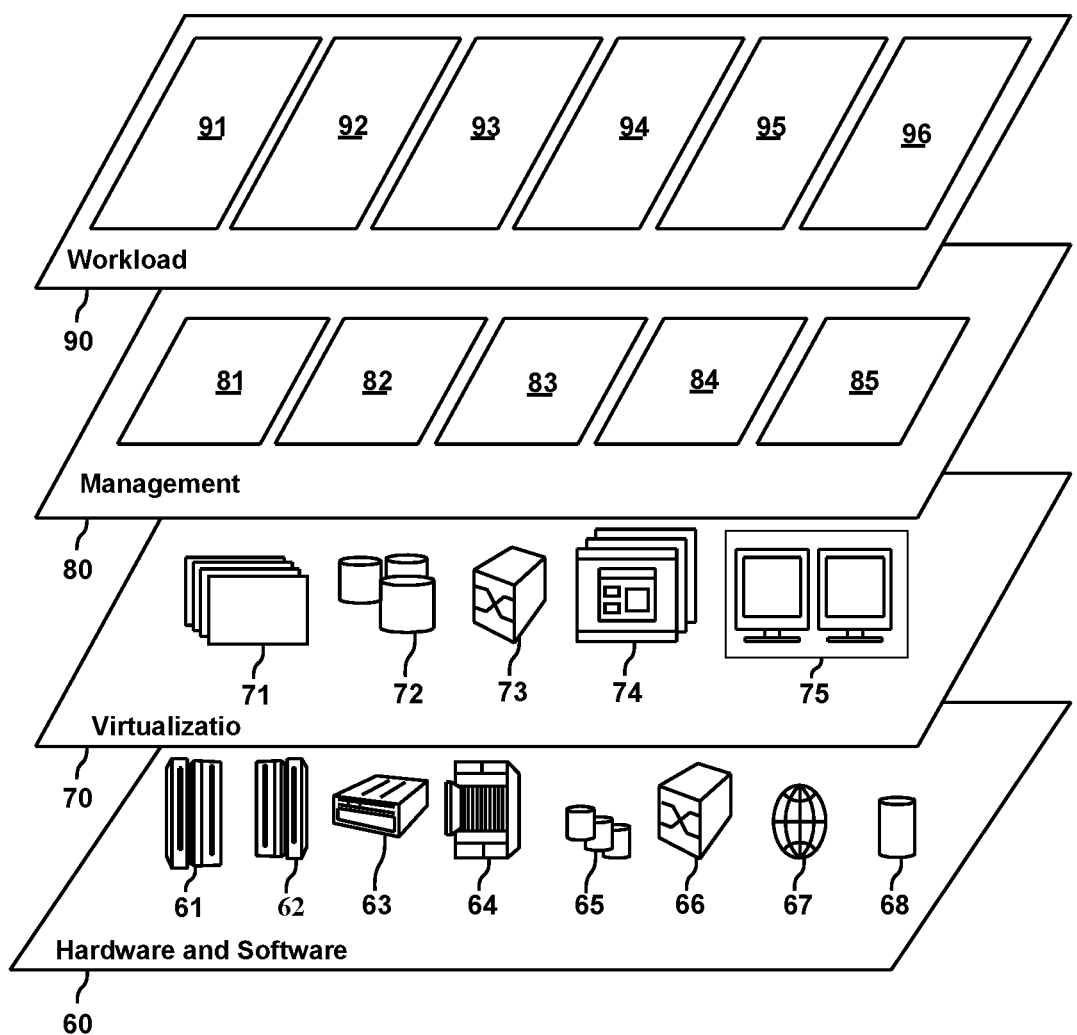
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image obtaining 96.

It is well known that emojis can be used for expressing emotions of users. However, the emojis are provided by different service providers, and sometimes a user may not find an appropriate emoji. Moreover, it is time-consuming for the user to manage emojis.

According to embodiments of the invention, expressional images can be used to express emotions of users as alternatives of emojis. Expressional images include any type of images that can be used to express emotions. For example, a user, after getting permission, can download an image via the Internet or select an image from a local image database, and then add the image into chatting messages or other articles as expressional images to express emotions of the user. Besides, expressional images also can be attached to other types of texts, videos, audios or other type of contents for expressing emotions of the user.

Embodiments of the present invention provide a method, system and computer program product for obtaining images according to an emotional status of a user. The user can use the personalized images to express his/her emotions. It shall be understood that the methods for obtaining images provided by the present invention can be implemented by any type of device, for example, a user device, or a server, etc.

According to embodiments of the present invention, a user can input one or more types of contents, including but not limited to texts, video data, voice data, etc. The inputted content can be used in a plurality of applications. One or more expressional images used in the above contents can be obtained before, in parallel with or after inputting the contents to express emotions of users.

The method, system and computer program product provided by the present invention can be applied in a plurality of applications, including but not limited to social networking applications, instant messaging applications, document editors, article publication, blog, microblog, etc.

Social networking applications is used as an example environment hereafter. It shall be understood that the present invention is not limited to social networking applications.

Figure 4:
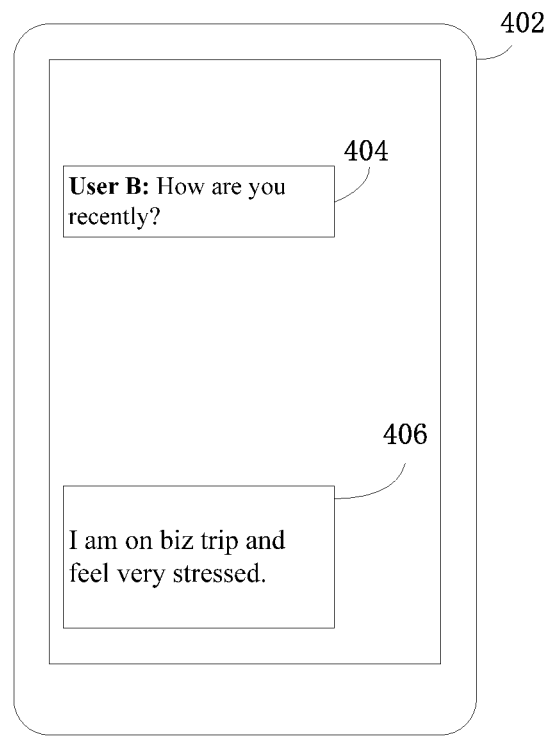
FIG. 4 depicts a first example user device according to an embodiment of the present invention.

FIG. 4 depicts a first example user device according to an embodiment of the present invention. With reference now to FIG. 4, user A can chat with user B using device 402 of user A. Device 402 and another device used by the user B can be any type of computing device, such as a smart phone, a personal digital assistant (PDA), a cellular telephone, a tablet, a laptop computer, a desktop computer, a node in a network, or a display terminal, etc. Chatting messages between user A and user B can comprise texts inputted or selected by user A and/or user B. The chatting messages can also comprise figures, icons, videos, audios, etc.

For example, the chatting messages can comprise message 404. Message 404 can comprise a text "How are you recently?" sent from user B to user A. Message 404 can be displayed on a display screen of the device 402. Content 406 can be a text "I am on biz trip and feel very stressed" inputted by user A. Content 406 can be sent from user A to user B as a response message to message 404. It shall be understood that content 406 can also comprise other figures, images, icons, videos, audios, etc. Content 406 can also be displayed on the display screen.

Here content 406 can be analyzed using emotion recognition technologies to determine emotional status of user A. The analysis can be initiated in response to detecting a start, interruption or end of an inputting action, such as, detecting a predefined content inputted by user A, or detecting a predefined action by user A. For example, user A can touch or select an icon in a user interface provided by the device 402, after receiving the inputting of content 406, device 402 may start the analysis of content 406. In a further example, content 406 may be analyzed in real time in parallel with detecting inputs from user A.

The emotion recognition technologies can comprise text emotion analysis technology, soundtrack emotion analysis technology, facial expression emotion analysis technology, etc. In an example, natural language processing technologies can be used to obtain emotional status of user A. It is to be understood that any other emotion recognition technology now known or to be developed can also be applied. Many existing emotion cognition systems provided by different companies can also be applied to determine the emotional status, such as Watson sentiment analysis API, etc.

According to embodiments of the invention, the emotional status of user A can comprise emotion values of one or more emotion categories, such as joy, anger, disgust, fear, and sadness, excited, tired, stressed, etc. It is to be understood that any other emotion categories now known or to be developed can also be applied.

Emotion values of one or more emotion categories can be used to represent measurements or degrees of one or more emotion categories of user A. The emotion values of one or more emotion categories can be determined using emotion recognition technologies or systems.

The emotion values can be normalized to be values between 0 and 1. A normalized emotion value of an emotion category may be used to represent the occurrence possibility and/or degree of a corresponding emotion category. In an example, for content 406 "I am on biz trip and feel very stressed", as keywords "very" and "stressed" can be detected, the emotion category of user A can be determined as "Stressed", and the emotion value for emotion category "Stressed" can be a number, for example, 0.9. In another example, content 406 can be a text content "I am very happy", the emotion category of user A can be determined as "Joy", and emotion value for emotion category "Joy" can be a number, for example, 0.9. It shall be understood many motion recognition technologies or systems now known or to be developed can be used to provide such emotion categories and emotion values.

For example, a content inputted by user A can be analyzed, and a set of emotion values can be obtained. Normalized emotion values of an emotion category may be used to represent the occurrence possibility, measurement or degree of the corresponding emotion catalog. The highest emotional value can be selected to express the emotional status of user A. For example, normalized emotion values, such as "Anger 0.87; Disgust 0.17; Fear 0.09; Joy 0.00; Sadness 0.13", etc. can be determined after the analysis. In this example, as value "0.87" of emotion catalog "Anger" is the highest value, the emotion status of the user can be determined as "Anger 0.87".

In another example, the emotional status can be represented as positive/negative degree of the emotion. An emotion value between 0 and 1 can be used to represent the positive/negative degree. For example, for content 406 "I am on biz trip and feel very stressed", as keywords "very" and "stressed" can be detected, the emotional status of user A can be represented as an emotion value, for example, 0.1, which means the emotional status of the user is very negative. In another example, the content 406 can be a text content "I am very happy", the emotional status of user A can be represented as an emotion value, for example, 0.9, which means the emotional status of the user is very positive.

According to embodiments of the invention, the emotional status of user A can also be determined according to facial expressions of user A, voices of user A, and/or physiological data of user A.

For example, an image obtaining apparatus on the device 402 can be used to obtain face images of user A. The obtained face images can be analyzed using emotion recognition technologies or systems. Then, the emotional status of user A can be determined. The emotional status of user A can also be represented as emotion values of one or more emotion categories, and/or positive/negative degrees. In this example, device 402 can also obtain the face images, voices, or physiological data of user A from another device carried by or close to user A.

In a further example, content 406 can comprise a text "I am on biz trip and feel very stressed, but when I am thinking of my lovely daughter, I feel very happy." Content 406 can be divided into three sub texts "I am on biz trip and feel very stressed", "but when I am thinking of my lovely daughter" and "I feel very happy" using emotion recognition technologies or systems. Emotional statuses respectively corresponding to the three sub texts can be determined using emotion recognition technologies or systems.

According to embodiments of the invention, at least one character can be determined based on a preference of user A. The preference of user A can be a file in any format, which can be used to record preference information of the user. The preference of user A can be stored on device 402, a nearby or remote device outside of device 402, or a server, etc. An identity of user A can be obtained by the device 402 by receiving an input from the user, or by using facial recognition technologies, biometric identification technologies, etc. Then, the preference of user A can be obtained based on the identity of the user. The one or more characters can comprise an actual or fictional person, a cartoon character, etc.

In an example, the preference can be set by user A. User A can set or select one or more favorite characters and then save the one or more favorite characters as a preference. The favorite characters can comprise one or more real or fictional characters, such as a movie star, a real person, a cartoon character, etc. User A may set himself/herself as a favorite character.

In another example, the preference can be obtained by analyzing behaviors or social relationship of user A. Many methods now known or to be developed can be used to analyzing the behaviors or social relationship of user A. For example, movies, TV programs viewed by user A can be analyzed, and then a character in a movie or TV program, or an actor/actress of the movie or TV program can be set as the user preference. In a further example, social relationship of user A can also be analyzed to determine one or more favorite persons. It shall be understood that the user behavior or social relationship analysis shall follow legal or user privacy requirements.

According to embodiments of the invention, one or more images comprising the at least one character can be obtained based on the emotional status of user A. The obtained one or more images can comprise a same character or a plurality of characters.

According to embodiments of the invention, one or more images can be obtained from: (1) a photo album authorized by user A and/or other users, for example, a photo album comprising one or more photos of the favorite characters; and/or (2) a personal interested image repository collected based on the preference of user A (e.g. images of user A's favorite movie stars, cartoon characters, etc.). The one or more candidate images can also be obtained by searching images comprising the determined character via Internet. It shall be understood that the image usage shall also follow legal or user privacy requirements.

According to embodiments of the invention, the obtained one or more images can be an image comprising a character, whose emotional status is matched with or is close to the emotional status of user A. It shall be understood that the emotional status of the character being matched with or close to the emotional status of user A may include: the emotion value of the character in the obtained image and the emotion value of user A are same or have a difference meeting a preset requirement. For example, when the emotional status of user A is determined to be "Joy: 0.9", the obtained image can be an image comprising a character whose facial expression is also joyful, or even have an emotion value equal to or close to "Joy: 0.9".

According to embodiments of the invention, a plurality of candidate images can be analyzed to determine emotional statuses of the character comprised in the plurality of candidate images. Emotion recognition technologies or systems now know or to be developed can be used to determine the emotional statuses of the character. An image with a character whose emotional status is matched with or close to the emotional status of user A can be selected from the plurality of candidate images for expressing the emotion of user A. For example, if the emotional status of user A is "Joy: 0.9", an obtained image comprises a character whose emotion value is "Joy: 0.8", and another obtained image comprises a character whose emotion value is "Joy: 0.5", then the image comprising the character whose emotion value is "Joy: 0.8" can be obtained as an image expressing the emotion of user A.

Figure 5:
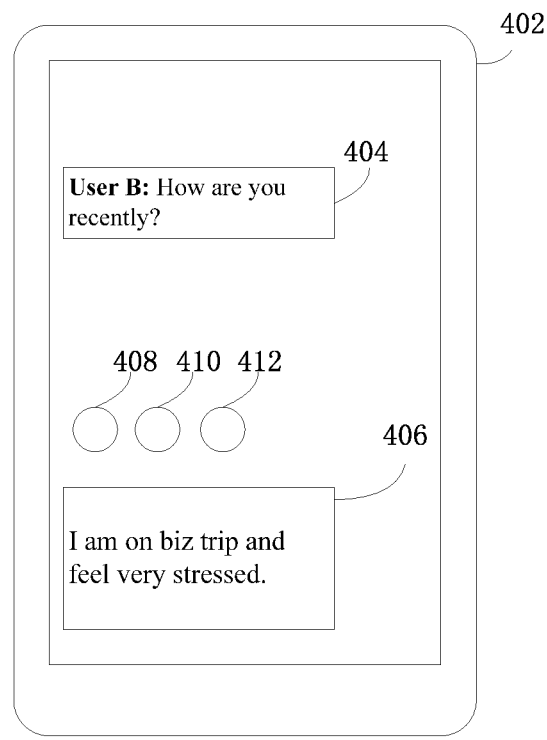
FIG. 5 depicts a second example user device according to an embodiment of the present invention.

In some embodiments, user A can select an image from a plurality of candidate images to express the emotional status. For example, FIG. 5 depicts a second example user device according to an embodiment of the present invention, in which a plurality of images, 408, 410 and 412 can be obtained based on the emotional status of user A and shown on the display screen of device 402. In FIG. 5, images 408, 410 and 412 are represent with circles, and specific contents of the images are omitted. The plurality of images 408, 410 and 412 can be images comprising a same character or a plurality of characters. At least one image, for example image 408 can be selected, based on actions and/or input of user A, as an image expressing the emotion of user A. For example, user A can touch or click an area on the screen of the device 402 corresponding to the image 408 to select the image 408 as the image expressing the emotion of user A.

According to embodiments of the invention, if emotional status of a character comprised in an obtained image is not matched with the determined emotional status of user A, the obtained image can be customized according to the determined emotional status of the user. For example, if emotional status of user A is "Joy: 0.9", and an image comprising a favorite character whose emotion value is "Joy: 0.8" is obtained, the obtained image can be customized.

According to embodiments of the invention, many image processing methods can be used to customize the obtained image according to the determined emotional status of the user. It shall be understood that the following methods provided by the invention are for describing concepts of the invention, and the scope of the invention is not limited on these methods.

For example, if the emotion value of user A is determined to be "Joy: 0.9", and the emotion value of the character comprised in the image is "Joy: 0.5", the facial expression of the character can be customized to be matching with "Joy: 0.9". That is to say, the emotion value of the character in the customized image can be matched with "Joy: 0.9".

Figure 6:
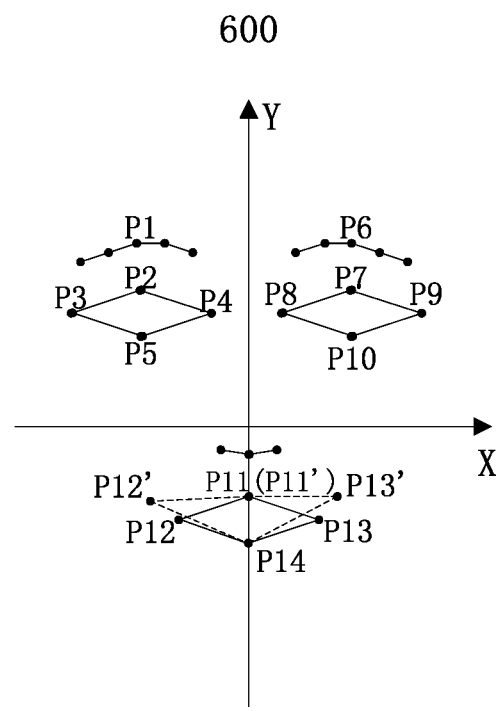
FIG. 6 depicts an example coordinate system according to an embodiment of the present invention.

According to embodiments of the invention, FIG. 6 depicts an example coordinate system according to an embodiment of the present invention. With reference now to FIG. 6, after obtaining an image, the image can be mapped to a coordinate system 600. For example, as the image comprises at least one character, the face area of one character can be recognized using a plurality of image recognition technologies. The origin of the coordinate system 600 can correspond to the position of tip of the nose of the character. It shall be understood that the origin can corresponds to any other position in the image to be customized, such as the center of the image, the lower-left corner of the image, etc. The X-axis and Y-axis scales can be configured according to size of the image or actual needs. For example, a length of 10 pixels in the image can be mapped to 1 scale in the X-axis and/or 1 scale in the Y-axis in the coordinate system 600. It shall be understood that other mapping manners can also be applied, for example, a length of 100 pixels corresponding to 1 X-axis scale and/or 1 Y-axis scale, etc.

Then one or more feature points can be identified, such as the eyes, eyebrows, lips or other facial areas of the character. It shall be understood that any number of feature points can be identified for the facial area of the character. As an example, points P1-P15 are identified in FIG. 6, wherein point P1 corresponds to a peak point of the right eyebrow of the character in the image (the left and right direction of the character in the image may be opposite to the left and right direction of a viewer of the image). Points P2-P5 respectively correspond to a peak point, a rightmost point, a leftmost point, and a bottom point of the right eye of the character. Point P6 corresponds to a peak point of the right eyebrow of the character. Points P7-P10 respectively correspond to a peak point, a rightmost point, a leftmost point, and a bottom point of the left eye of the character. Points P11-P14 respectively correspond to a peak point, a rightmost point, a leftmost point, and a bottom point of the lip of the character.

The points P1-P15 can be mapped to a plurality of points in the coordinate system 600, which means each of the points P1-P15 can be assigned corresponding x-coordinate and y-coordinate values. The points P12 and P13 can be taken as an example, wherein x-coordinate and y-coordinate values of the point P12 is (−3, −2); and x-coordinate and y-coordinate values of the point 13 can be (3, −2).

According to embodiments of the invention, the updated x-coordinate and y-coordinate values of a feature point can be determined based on the determined emotional status of user A. For example, the x-coordinate and y-coordinate values of the points P1-P15 can be updated according to the determined emotional status of user A.

Taking the point P12 as an example, a maximum adjusting scale corresponding to a largest emotion value of an emotion category of user A can be set for the image. For example, for a largest emotion value "Joy: 1", the maximum adjusting scale of P12 can be configured to −1.2 X-axis scales and 1.2 Y-axis scales. In another example, the maximum adjusting scale in the X-axis can be set to 0.4*x-coordinate values of the point P12; and the maximum adjusting scale in the Y-axis can be set to −0.6*Y-coordinate values of the point P12. It shall be understood that maximum adjusting scales can be set according the needs, and other numbers and/or ratios can also be applied. Maximum adjusting scales can also be set based on personal characteristics, such as age, face shape, body shape, etc., of the character comprised in the image to be customized. Similarly, maximum adjusting scales can be set for the other feature points. Maximum adjusting scales for different emotion categories can be different. Those skilled in the art would able to set the maximum adjusting scales for different emotion categories.

In an example, the updated x-coordinate and y-coordinate values of a feature point can be determined using the following formulas:

$$UX=CX+EV*MX;$$

$$UY=CY+EV*MY;$$

wherein, UX and UY respectively are the updated x-coordinate value and y-coordinate values of the feature point, CX and CY respectively are current x-coordinate value and y-coordinate value of the feature point; EV is the normalized emotion value of the user; and MX and MY respectively are the maximum adjusting scale preset in the X-axis and in the Y-axis corresponding to the feature point.

In another example, the parameter EV can be determined using emotion recognition technologies or systems. For example, the EV can be one or more normalized emotion values of one or more emotion categories. For example, the EV can be a number between 0 and 1 representing measurements or degrees of one or more emotion categories of user A. In an example, if emotional status of the user is determined to be "Joy: 0.9", the parameter EV can be 0.9.

In another example, the parameter EV can be a number between 0 and 1 used to represent the positive/negative degree of the emotional status of the user.

According to embodiments of the present invention, one or more differences between the emotional status of the character comprised in the image to be customized and the emotional status of user A can be analyzed. Then adjusting scale for the features points of the character can be determined based on the differences. For example, the updated x-coordinate and y-coordinate values of a feature point can be determined based on an emotional status of user and the emotional status of the character.

As an example, the updated x-coordinate and y-coordinate values of a feature point can be determined using the following formulas:

$$UX=CX+(EV-EVC)*MX;$$

$$UY=CY+(EV-EVC)*MY;$$

wherein, UX and UY respectively are the updated x-coordinate value and y-coordinate values of the feature point, CX and CY respectively are the current x-coordinate value and y-coordinate value of the feature point; EV is the normalized emotion value of the user; EVC is the emotion value of the character; and MX and MY respectively are the maximum adjusting scale preset in the X-axis and in the Y-axis corresponding to the feature point.

In an example, if emotional status of the user is determined to be "Joy: 0.9" and the emotion status of the character in the image is "Joy: 0.6", the parameter EV can be 0.9, and the parameter EC can be 0.6.

According to embodiments of the invention, if the emotional status of the user is determined to be "Joy: 0.9", the updated x-coordinate and y-coordinate values of the points P12 and P13 can also be obtained using a mapping table between emotion values (Joy) and positions, such as Table 1. In this example, the updated x-coordinate and y-coordinate values of updated position of P12 can be (−4.08, −0.92); and the updated x-coordinate and y-coordinate values of rendering position of P13 can be (4.08, −0.92). Similarly, updated x-coordinate and y-coordinate values of updated positions can be set for other feature points. The mapping table can be pre-defined by a server or by user A. Mapping tables for different emotion categories can be different. Those skilled in the art would be able to set the mapping tables for different emotion categories.

TABLE 1

Example Mapping between Emotion Values and Positions

| Emotion Values (Joy) | 0.1 | 0.2 | 0.3 | 0.4 | 0.5 | 0.6 | 0.7 | 0.8 | 0.9 | 1 |
|---|---|---|---|---|---|---|---|---|---|---|
| P12-X | −3.12 | −3.24 | −3.36 | −3.48 | −3.6 | −3.72 | −3.84 | −3.96 | −4.08 | −4.2 |
| P12-Y | −1.88 | −1.76 | −1.64 | −1.52 | −1.4 | −1.28 | −1.16 | −1.04 | −0.92 | −0.8 |
| P13-X | 3.12 | 3.24 | 3.36 | 3.48 | 3.6 | 3.72 | 3.84 | 3.96 | 4.08 | 4.2 |
| P13-Y | −1.88 | −1.76 | −1.64 | −1.52 | −1.4 | −1.28 | −1.16 | −1.04 | −0.92 | −0.8 |

After determining the updated x-coordinate value and y-coordinate values of the feature points, the facial area of the character in the image can be adjusted according to the updated x-coordinate value and y-coordinate values. Many existing image processing technologies or methods can be used to adjust the facial area of the character in the image according to the updated x-coordinate value and y-coordinate values.

For example, points P12 and P13 can be moved to updated positions corresponding to the updated x-coordinate value and y-coordinate values, such that updated points P12' and P13' can be obtained in FIG. 6. In an example, points P12 and P13 may be pixel points in the image, and the pixel points can be moved to the updated positions.

Original points between the feature points, such as original points between points P12 and P11, etc., can also be moved to new positions between the updated position of P12 and P11. Some original points between points P12 and P11 can be copied or omitted to fill in the positions between the updated position of points P12 and P11.

The above methods are for describing the present invention. It shall be understood that many other methods can be used to adjust positions of feature points of the character in the image based on emotional statuses of users.

Figure 7:
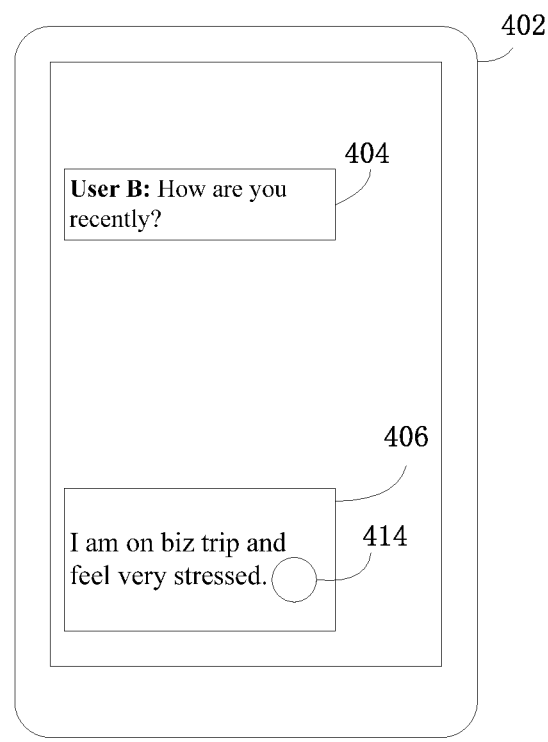
FIG. 7 depicts a third example user device according to an embodiment of the present invention.

FIG. 7 depicts a third example user device according to an embodiment of the present invention. With reference now to FIG. 7, in an embodiment, the obtained or customized images can be attached to content 406. For example, one of the obtained or customized images, such as image 414, can be shown on the display screen of the device 402 automatically. In FIG. 7, image 414 is represent with circles. Content 406 along with image 414 can be further sent to the user B.

According to embodiments of the invention, a plurality of obtained and/or customized images can be displayed on the displayer of the device 402. User A can touch or click an area on the displayer of the device 402 corresponding to the obtained or customized images to select at least one image 414 as an image to be attached to content 406.

Figure 8:
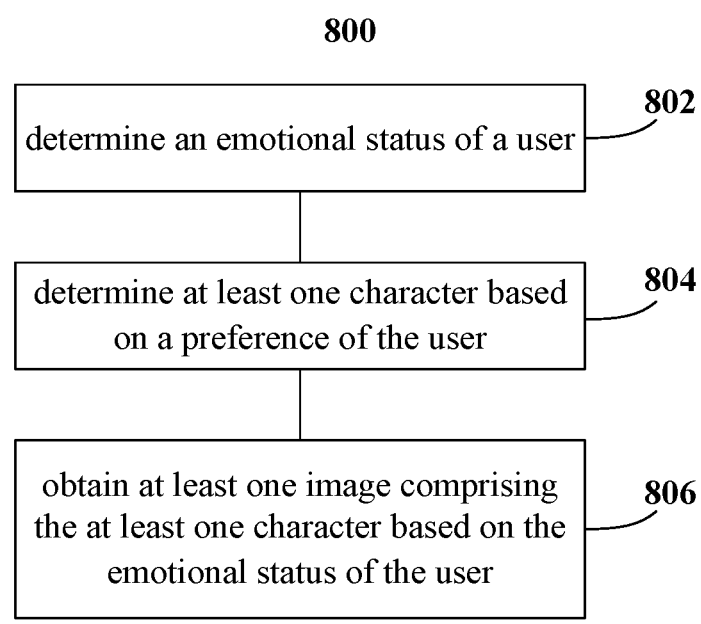
FIG. 8 depicts a flowchart of an example method for obtaining an image according to an embodiment of the present invention.

According to an embodiment of the present invention, there is provided a computer-implemented method for obtaining an image. With reference now to FIG. 8, in which a flowchart of an example method 800 for obtaining an image is illustrated. The methods for obtaining an image provided by the present invention can be implemented by any type of device, for example, the device 402, another device besides the device 402, a remote device, or a sever, etc.

In block 802, an emotional status of a user is determined. Then in block 804, at least one character can be determined based on a preference of the user. In block 806, at least one image comprising the at least one character can be obtained based on the emotional status of the user.

According to another embodiment of the present invention, there is provided a computer system for obtaining an image. The computer system comprises a processor, a computer-readable memory coupled to the processor. The computer-readable memory comprises instructions that when executed by the processor perform actions of: determining an emotional status of a user; determining at least one character based on a preference of the user; and obtaining at least one image comprising the at least one character based on the emotional status of the user.

According to another embodiment of the present invention, there is provided a computer program product for obtaining an image. The computer program product comprises a computer readable storage medium having program instructions embodied therewith, the program instructions executable by a processor to cause the processor perform actions of: determining an emotional status of a user; determining at least one character based on a preference of the user; and obtaining at least one image comprising the at least one character based on the emotional status of the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining an emotional status of a user, comprising determining one or more emotion values;
   determining at least one character based on a preference of the user;
   obtaining at least one image comprising the at least one character based on the emotional status of the user;
   determining at least one feature point of the at least one character;
   determining a current position of the at least one feature point;
   determining an updated position of the at least one feature point according to the current position and the one or more emotion values; and
   moving the at least one feature point from the current position to the updated position in the at least one image.

2. The computer-implemented method according to claim 1, further comprises:
   in response to determining that an emotional status of the at least one character in the at least one image does not match the emotional status of the user, determining to customize the at least one image according to the emotional status of the user.

3. The computer-implemented method according to claim 2, wherein the customizing the at least one image comprises:
   adjusting a position of a plurality of feature points of the at least one character in the at least one image according to the emotional status of the user.

4. The computer-implemented method according to claim 1, wherein the obtaining the at least one image comprises:
   obtaining a plurality of candidate images comprising the at least one character; and
   obtaining, from the plurality of candidate images, the at least one image in which an emotional status of the at least one character matches with or is close to the emotional status of the user.

5. The computer-implemented method according to claim 1, wherein the determining the emotional status of the user comprises:
   obtaining emotion information of the user, wherein the emotion information comprises at least one of the following: contents inputted by the user, facial expressions of the user, voice data of the user, or physiological data of the user; and
   determining the user emotional status by analyzing the emotion information.

6. The computer-implemented method according to claim 1, further comprises:
   attaching the at least one image to a content inputted by the user.

7. A computer system comprising:
   a processor;
   a computer-readable memory coupled to the processor, the computer-readable memory comprising instructions that when executed by the processor perform actions of:
   determining an emotional status of a user, comprising determining one or more emotion values;
   determining at least one character based on a preference of the user;
   obtaining at least one image comprising the at least one character based on the emotional status of the user;
   determining at least one feature point of the at least one character;
   determining a current position of the at least one feature point;
   determining an updated position of the at least one feature point according to the current position and the one or more emotion values; and moving the at least one feature point from the current position to the updated position in the at least one image.

8. The computer system according to claim 7, wherein the actions further comprise:

in response to determining that an emotional status of the at least one character in the at least one image does not match the emotional status of the user, determining to customize the at least one image according to the emotional status of the user.

9. The computer system according to claim 8, wherein the customizing the at least one image comprises:

adjusting a position of a plurality of feature points of the at least one character in the at least one image according to the emotional status of the user.

10. The computer system according to claim 7, wherein the obtaining the at least one image comprises:

obtaining a plurality of candidate images comprising the at least one character; and obtaining, from the plurality of candidate images, the at least one image in which an emotional status of the at least one character matches with or is close to the emotional status of the user.

11. The computer system according to claim 7, wherein the determining the emotional status of the user comprises:

obtaining emotion information of the user, wherein the emotion information comprises at least one of the following: contents inputted by the user, facial expressions of the user, voice data of the user, or physiological data of the user; and determining the user emotional status by analyzing the emotion information.

12. The computer system according to claim 7, wherein the actions further comprise:

attaching the at least one image to a content inputted by the user.

13. A computer program product, comprising a non-transitory computer readable storage medium having program instructions embodied therewith, the program instructions executable by a processor to cause the processor to perform actions of:

determining an emotional status of a user, comprising determining one or more emotion values;

determining at least one character based on a preference of the user;

obtaining at least one image comprising the at least one character based on the emotional status of the user;

determining at least one feature point of the at least one character;

determining a current position of the at least one feature point;

determining an updated position of the at least one feature point according to the current position and the one or more emotion values; and moving the at least one feature point from the current position to the updated position in the at least one image.

14. The computer program product according to claim 13, wherein the actions further comprise:

in response to determining that an emotional status of the at least one character in the at least one image does not match the emotional status of the user, determining to customize the at least one image according to the emotional status of the user.

15. The computer program product according to claim 14, wherein the customizing the at least one image comprises:

adjusting a position of a plurality of feature points of the at least one character in the at least one image according to the emotional status of the user.

16. The computer program product according to claim 13, wherein the obtaining the at least one image comprises:

obtaining a plurality of candidate images comprising the at least one character; and obtaining, from the plurality of candidate images, the at least one image in which an emotional status of the character matches with or is close to the emotional status of the user.

17. The computer program product according to claim 13, wherein the determining the emotional status of the user comprises:

obtaining emotion information of the user, wherein the emotion information comprises at least one of the following: contents inputted by the user, facial expressions of the user, voice data of the user, or physiological data of the user; and determining the user emotional status by analyzing the emotion information.

* * * * *